United States Patent [19]

Ballini et al.

[11] 3,971,111

[45] July 27, 1976

[54] APPARATUS FOR TRANSFERRING AND FINISHING ITEMS CAST SEVERAL AT A TIME IN A CHILL MOLD

[75] Inventors: Andre Ballini, Arnouville-les-Gouesse; Roger Bailly, Mendou, both of France

[73] Assignee: Regie Nationale des Usines Renault, Boulogne-Billancourt, France

[22] Filed: Feb. 14, 1974

[21] Appl. No.: 442,649

[30] Foreign Application Priority Data

Feb. 14, 1973 France .............................. 73.05210

[52] U.S. Cl. .............................. 29/38 C; 29/33 C; 29/156.5; 29/527.6; 164/270; 198/220 BA
[51] Int. Cl.² ......................................... B23P 15/10
[58] Field of Search ............ 164/269, 270, 76, 113, 164/120, 128; 29/156.5 R, 430, 527.6, 33 L, 33 P, 563, 38 C; 99/643, 638; 193/2 B; 198/220 BA, 229

[56] References Cited

UNITED STATES PATENTS

| | | | |
|---|---|---|---|
| 1,528,132 | 3/1925 | Ripley | 99/638 |
| 2,382,134 | 8/1945 | Coons | 99/638 X |
| 3,698,471 | 10/1972 | Chatourel et al. | 164/113 X |

*Primary Examiner*—Othell M. Simpson
*Assistant Examiner*—Z. R. Blinsky
*Attorney, Agent, or Firm*—Oblon, Fisher, Spivak, McClelland & Maier

[57] ABSTRACT

An apparatus for transferring and finishing items cast several at a time in a chill mold which comprises a conveyor for cooling the items connected at its upper end to a means of transfer of the items from the output of a casting machine and below to a means of transfer which feeds a turntable on which the items are selectively mounted for their machining while passing before a turning unit and a broaching unit. In a preferred embodiment the present invention is utilized for transferring and finishing pistons.

7 Claims, 16 Drawing Figures

APPARATUS FOR TRANSFERRING AND FINISHING ITEMS CAST SEVERAL AT A TIME IN A CHILL MOLD

BACKGROUND OF THE INVENTION

1. Field of the Invention

The present invention is related to an apparatus for automatic transfer and finishing of items, for example pistons which are of light alloys and are cast several at a time in a chill mold. Even more particularly, the present invention accomplishes without human intervention all the operations of transferring and finishing the items, starting from their removal from the mold and proceeding until they are taken up for final finishing on transfer machines.

2. Description of the Prior Art

The difficulties of automating the finishing operations on foundry-produced parts are well-known, even when the parts are cast by methods which assure very reproducible characteristics such as chill molding under pressure or under low pressure as taught, for example, in French Pat. No. 6,935,366 in the same name as the assignee of the present application.

More particularly, the flashings on cast parts have irregularities in form which are ill-adapted to manipulation by mechanical means used in standard finishing operations. The necessity of cooling the parts entails periods of storage in cooling areas which are enlarged due to the high output of modern casting machines which produce a series of items at each injection. Correspondingly, the trimming methods must be rapid enough to keep up with this great output preferably without having to be expensively multiplied.

The foregoing difficulties of securing mechanical handling of parts prone to exhibiting irregularities in form, complicated by the great number and required coordination of different cycles of operation, have caused these finishing operations and handling of foundry parts to remain essentially manual and thus not amenable to total automation.

SUMMARY OF THE INVENTION

An object of the present invention is accordingly to provide an installation and apparatus permitting completely automatic operation for the finishing of, for example, pistons, of light alloys cast several at a time in chill molds.

The foregoing and other objects are attained in accordance with one aspect of the present invention through the provision of an apparatus which comprises a conveyor for cooling the parts which is connected above to a means of transferring the parts from the output of a casting machine and below to a transferring means which feeds a turntable on which the parts are mounted selectively for finishing while passing before a turning unit and a broaching unit.

According to another aspect of the present invention, the conveyor serves as the storage space for cooling the parts, and it is fed at one end by a means for transferring the castings and receives simultaneously the group of parts cast in a machine in each of its cycles of injection of metal. Further, it feeds at its other end a trimming machine which trims the cooled pistons one by one by finishing means having a high output rate.

The cooling conveyor consists of a series of parallel chutes forming an incline for the downward passage of the parts, each chute simultaneously receiving a part from each group made by the casting machine in each of its cycles. Each chute consists of an assembly of parallel bars onto which the unfinished part slides. The bars are arranged to contact those portions of the parts on their surface areas that are free of casting seams, and therefore free of burrs. A projecting portion of the part, such as for example its riser, is straddled by two bars to thus maintain a proper orientation thereof.

A vibrator attached to the frame of the conveyor facilitates the flow of the parts. Covering the conveyor is a hood for extracting any fumes created by the cooling parts. A cooling fluid, such as water or air, is sprayed on the surfaces of the parts. When water is utilized, the frame of the conveyor is enclosed with sheet metal to form a draining trough.

The transferring device consists of a bar to carry the parts by means of a row of holding means, such as bifurcated protrusions. These protrusions fit into orifices formed in the castings, which, in the case of pistons, comprise one of the piston pinholes. The pistons coming from the mold are forced against the protrusions by an ejection mechanism of the casting machine.

By known means, such as jacks and levers, the bar is then rotated 90° about its axis which orients the group of castings with their risers faced downwardly in proper position for placement on the cooling conveyor. The supporting bar attached at its end to a carriage, is then withdrawn with its load of castings from between the platens of the mold. It is then pivoted 90° horizontally which introduces the parts into tubes slotted at their base to receive the riser of the part together with the protrusions on which the parts are held by the elastic bifurcations thereof.

The tipping of these tubes from a horizontal to an inclined position permits the castings on the one hand to be separated from the protrusions on the supporting bar, and on the other hand to slide down the parallel cooling chutes of the conveyor. The empty tubes then reassume their horizontal position to receive a new set of castings.

The end of the supporting bar has support means for absorbing the forces resulting from the grasping of the castings and the freeing of them from the mold. When the castings are released by the tipping of the tubes, this support means also ensures precise positioning of the bar.

At the other end of the cooling conveyor there is positioned a transferring mechanism for loading the finishing machine.

The finishing machine is of the turntable variety comprising three stations: one for loading, one for turning and one for broaching and unloading.

The transferring mechanism then has the function of loading the machine part by part from among the parts arriving simultaneously group by group at the ends of their respective cooling conveyor chutes.

For this purpose, the mechanism has a carriage which moves horizontally in front of a line at the ends of the chutes. This carriage has a tiltable cradle which assumes a position before each of the chutes in turn to receive a part, and then, after positioning to a point under a loading station, a vertical jack built into the carriage raises the tiltable cradle, which, by the aid of its supports, assumes a horizontal position and positions the part which is contains between a plunger and the expandable mandrel of one of the holders on the trimming machine's turntable.

The plunger presses the part onto the mandrel while the cradle is lowered by the vertical jack to resume its initial tilted position on the horizontal carriage which, by means of sequentially actuated retractable stops, is moved successively in front of each chute to be loaded with a new part.

At the end of each chute a mechanism having two spaced stops assures the simultaneous retention of the next-to-last part and release of the last part to slide into the cradle. Then, by retraction of the second stop and re-extension of the first, the mechanism releases the next-to-last part to advance to the first stop, followed by the whole stack of parts in this chute of the conveyor.

The part holders on the turntable of the trimming machine are known types of expandable mandrels. They position the part successively before the tool of the turning head, which eliminates the riser from the part, and then before the broaching position, where the broaching head advances and closes on the external surface of the part which is clear of its holder. A vertical clamping jack tightens the jaws of the broaching head on the part. The part is disengaged from its mandrel when the broaching head retracts. A sideways translation of the head then moves the part against a fixed planing broach. The passage of the part past the broach performs the broaching operation which removes the burrs. In the case of pistons, the broach removes the burrs on the rim of the skirt as well as the flashings on the elongations of the skirt. The retraction of the broaching head at the same time as the advancement of ejectors produces the disengagement of the part, thereby premachined, against a stop at the end of the broaching pass. The part then falls into an evacuation trough.

Such an apparatus permits regrouping in a limited space next to the molding machine all the froundry finishing operations, producing parts of uniform and precise shape ready for transfer machine finishing. The foregoing is enabled by the combination of the main conveyor in the cooling area and mechanical transferring means for removal and feeding without rehandling or intermediate storage. The finishing operations are carried out with precision and rapidity as a result of the utilization of techniques heretofore reserved for mass-production machining, such as turning and broaching, thereby permitting very short operating times on multi-station transfer machines. Their use, according to the present invention, in finishing foundry parts eliminates the necessity for manual trimming operations which are dangerous and prone to human error.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
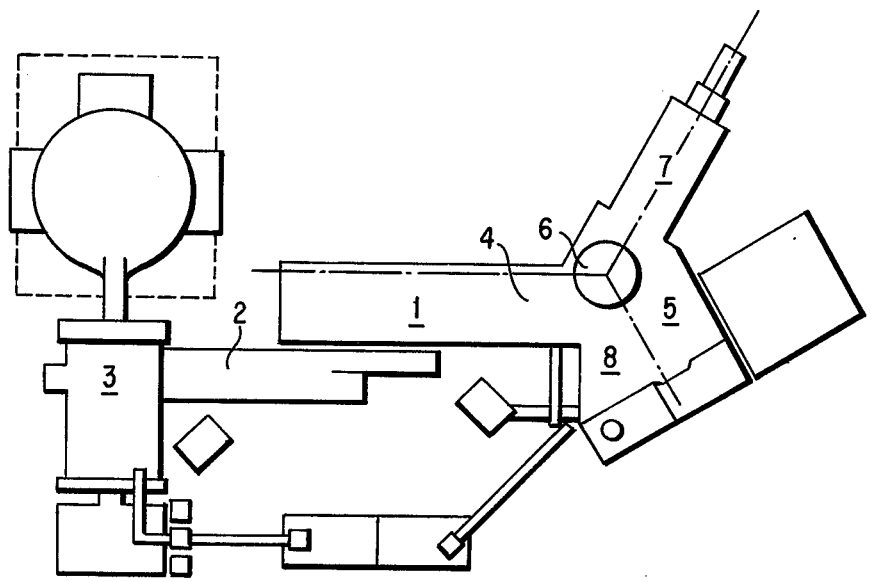
FIG. 1 is a schematic view of the layout of an installation according to a preferred embodiment of the present invention.

Referring now to the drawings, wherein like reference numerals designate identical or corresponding parts throughout the several views, and more particularly to FIG. 1 thereof, there is shown a preferred embodiment of the apparatus according to the present invention which comprises a conveyor-cooler 1 fed with castings by a transferring mechanism 2 from a casting machine 3. The conveyor-cooler 1 has a transferring means 4 positioned at its output which feeds a turntable 6 on which the parts are mounted for their machining while passing before a turning unit 7 and a broaching unit 5 from which they are directed to an evacuation unit 8.

Figure 2:
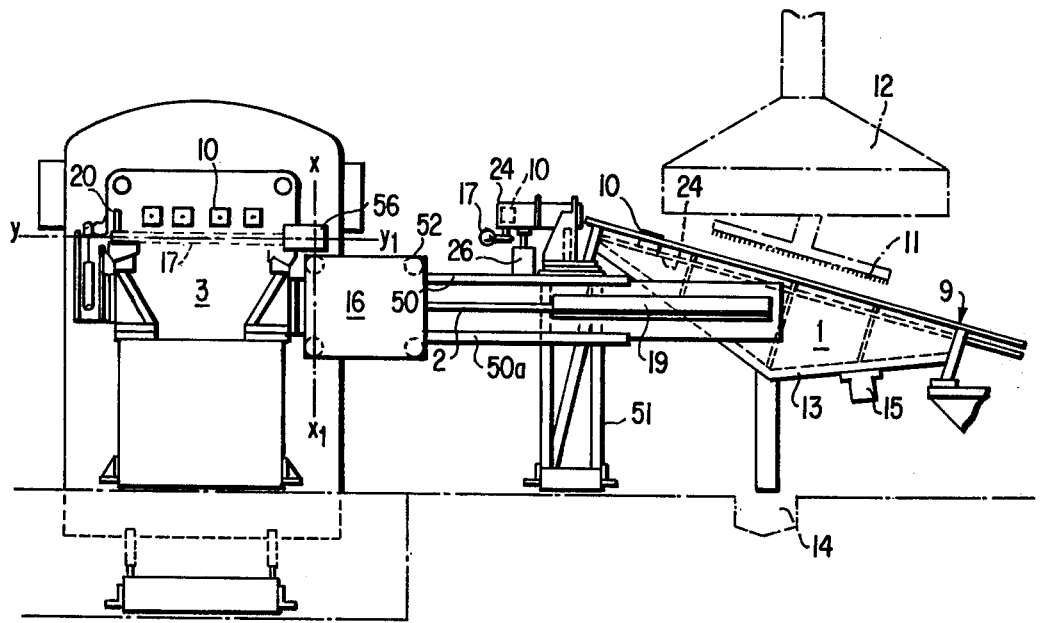
FIG. 2 is a view in elevation of the means for the transfer of castings from the mold to the cooling conveyor according to the present invention.
Figure 3:
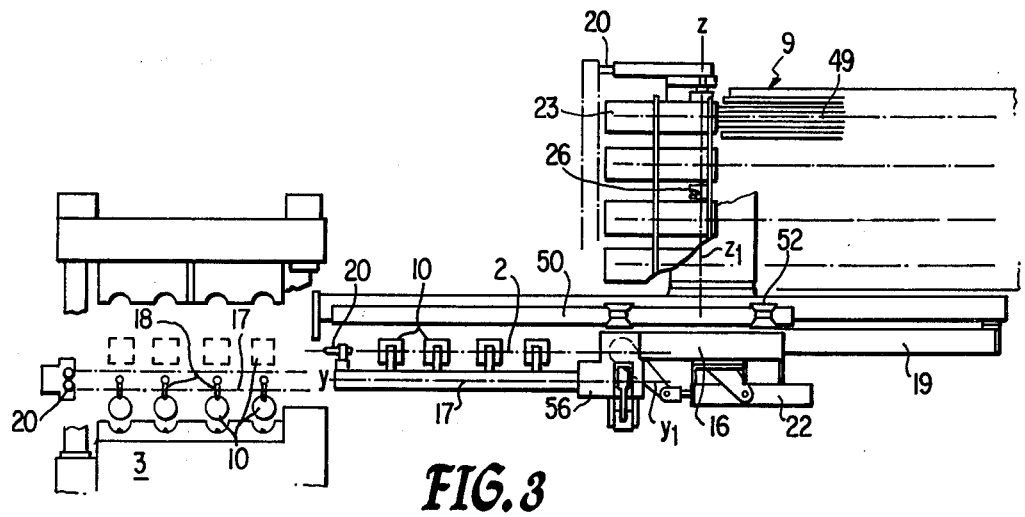
FIG. 3 is a top view of the apparatus shown in FIG. 2.

Referring now to FIGS. 2 and 3, there is shown in greater detail the conveyor-cooler 1 which comprises a frame 13 on which is fastened a series of parallel chutes 9 consisting of bars 49 (see also FIG. 9a), down which slide (by the force of gravity) the parts to be machined 10, depicted as, for example, cast pistons which have a riser 24 which projects through the gap provided between two lower bars 49 so as to guide the part.

Above the guiding chutes 9 of the parts 10 are provided a plurality of rows of sprayers 11 for directing a cooling fluid on the parts and a hood 12 for drawing off any fumes created thereby. If the coolent is a liquid, it is collected in a tank formed by frame 13 of the conveyor and then is directed down a drain 14. On the frame 13 of conveyor 1 there is fastened a vibrator 15 to facilitate the movement of the parts 10.

Figure 4:
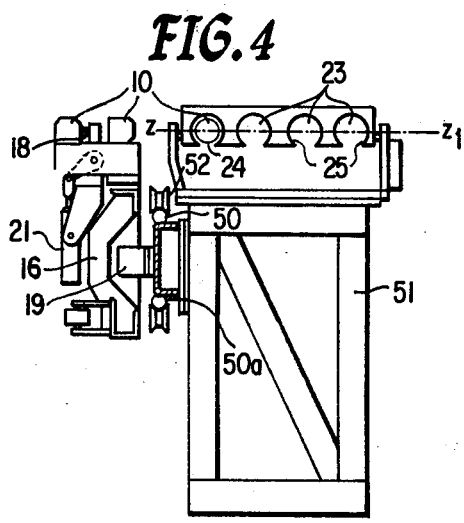
FIG. 4 is a side view showing the entry to the cooling conveyor and the transferring carriage.

The transfer mechanism 2 (seen in FIGS. 2, 3 and 4) consists of a carriage 16 having rollers 52 which ride on the guiding rails 50 and 50a which are fastened to a frame 51, the carriage 16 being moved by the jack 19.

Figure 5:
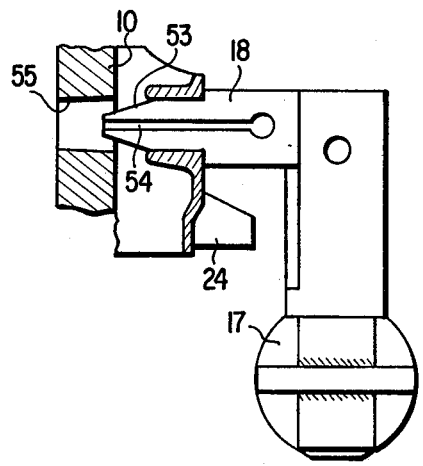
FIG. 5 is an enlarged cross-sectional view of the bar for carrying the parts and a bifurcated protrusion according to the present invention.

On carriage 16 is mounted a bar 17 which is simultaneously pivotable about a vertical axis $XX_1$ and about its own axis $YY_1$. Bar 17 bears a row of bifurcated protrusions 18 having the form of elastic pincers having a conical tip 53 and a slot 54 (see FIG. 5). The protrusions 18 are adapted to engage an orifice 55 in a part 10 when the bar 17 is introduced between the platens of the casting machine 3, as shown by dashed lines of FIG. 3, and each of the protrusions 18 is centered before an orifice 55 of a part 10 still embedded, before stripping in the chill-mold.

Bar 17 at its free end bears a centering pin 20 which fits in a retractable support to assure proper positioning of the bar 17 and the protrusions 18, as well as to provide firmness when the parts 10 are being passed onto the protrusions 18 by the mold's ejectors.

After retraction of the bar 17 with its load of parts 10 from the casting machine 3 to the position shown by the solid lines in FIG. 3, the bar 17 is rotated 90° about its own axis $YY_1$ with respect to a support 56 made integral with the carriage by means of a jack 21. The support 56 of bar 17 is rotatable on the carriage about an axis $XX_1$, and the bar 17 is pivoted by a jack 22 through an angle of 90° in a horizontal plane to place it in front of the input to conveyor 1 which has slotted tubular elements 23 facing the chutes and mounted so as to tilt about an axis ZZ on the frame 51 (see FIGS. 2, 3 and 4) by means of a jack 26.

The parts 10 carried on bar 17 enter the tubes 23 which have slots 25 on their undersides to receive the bifurcated protrusions 18 and the risers 24 of the parts 10. When jack 26 tilts tubes 23 about the axis $ZZ_1$, the protrusions 18 are disengaged from the orifices 55 of the parts 10 which, thus freed, first slide through the inclined tubes 23 and then down the chutes 9 of conveyor 1 which are aligned with tubes 23.

During the disengagement of the protrusions 18 by means of the tilting of tubes 23, the stop 20 again steadies the bar 17 against the forces of disengagement thereof.

Figure 6:
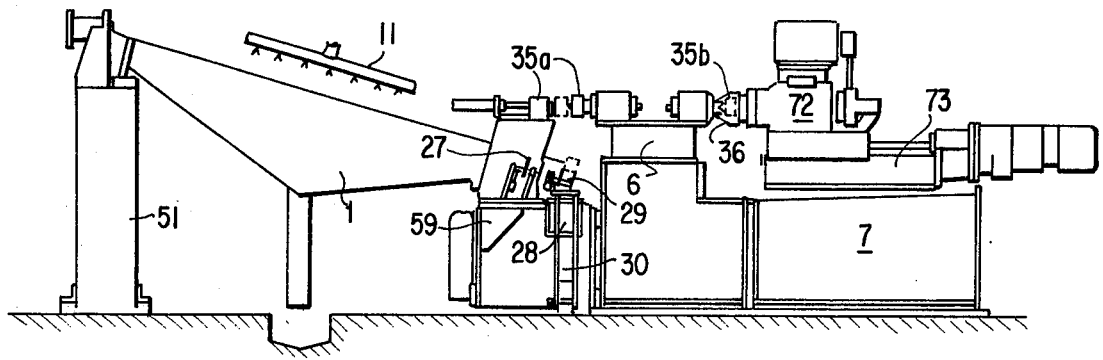
FIG. 6 is a view in elevation of the cooling conveyor, the transferring means at its output, and the trimming unit of the present invention.
Figure 7:
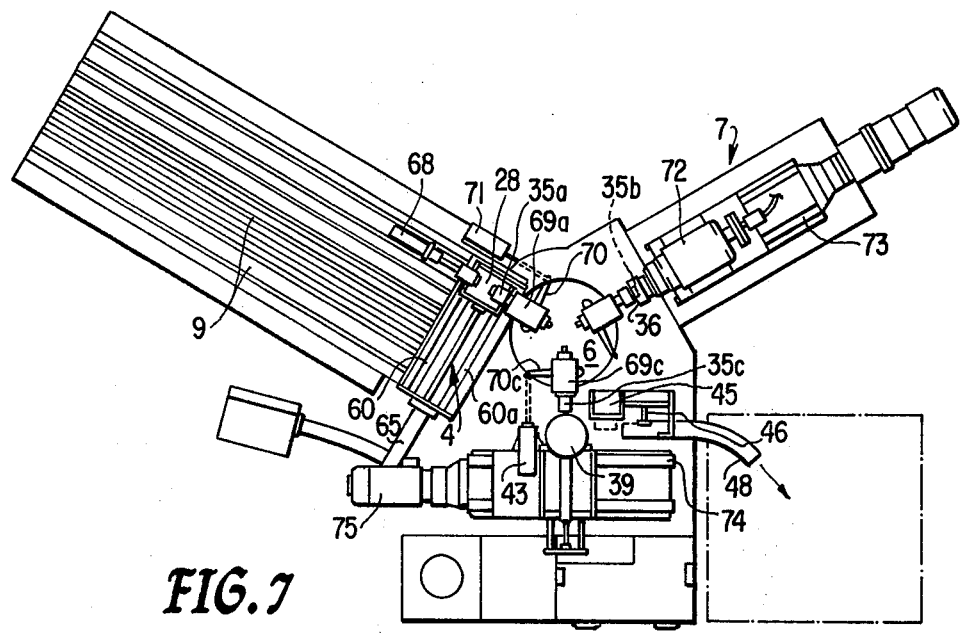
FIG. 7 is a plan view of the apparatus seen in FIG. 6.

After their descent down chutes 9 and their cooling by the rows of sprinklers 11, the movement of parts 10 is arrested by the stops 27 (see FIGS. 6 and 9) before being loaded on the transferring device at the output 4 (see FIGS. 1, 6 and 7).

At the end of each chute 9 there is positioned a stop lever 27 (seen in FIGS. 9 and 9a) and a release lever 33 fastened to the same axis 57 mounted to rotate in the support legs 58 and 58a made integral with a base 59. The levers 27 and 33 are positioned at different angles and are separated along axis 57 by a distance about equal to the length of one part. The axis 57 is connected to a jack 32 which controls levers 27 and 33 simultaneously.

Figure 9:
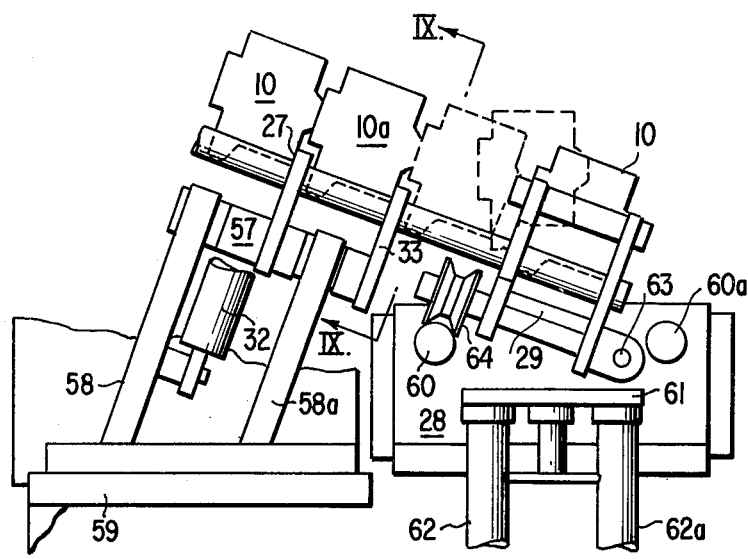
FIG. 9 is a detailed view of the output of the cooling conveyor and the carriage of the transferring means at its output.
Figure 9A:
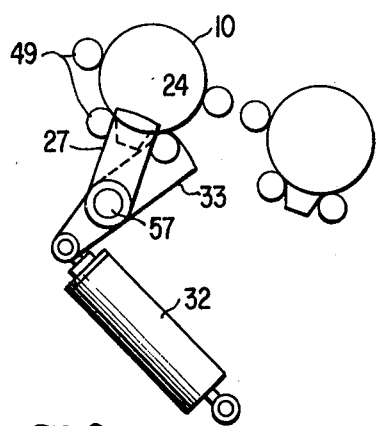
FIG. 9a is cross-sectional view through the line IX—IX of FIG. 9.
Figure 11:
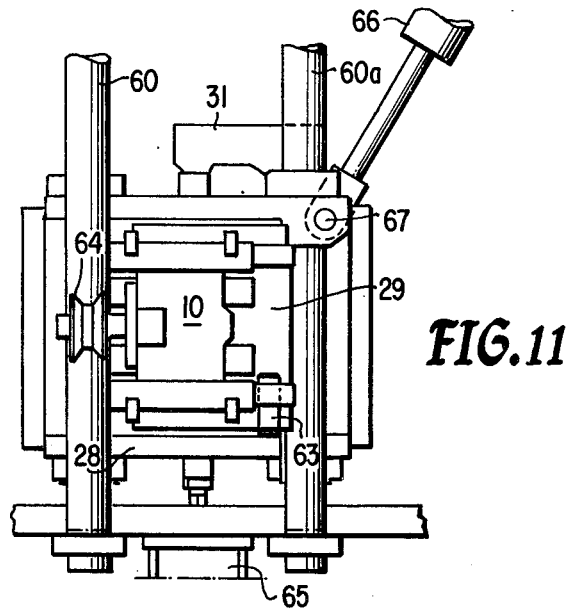
FIG. 11 is a top view of the carriage and cradle according to the present invention.

When lever 27 is in its up position holding back the stack of parts 10, as shown in FIGS. 9 and 9a, the lever 33 is moved aside, thereby releasing the last part indicated by reference numeral 10a located between these two levers. In the reverse situation, lever 27 is moved aside and lever 33 will hold back the stack of parts so that when lever 27 is returned to the arresting position, part 10a located between the levers will be released by moving aside of lever 33 for subsequent loading on the transferring device 4.

Still with reference to FIG. 9, the transferring device 4, located at the foot of chutes 8, comprises a structure 59 upon which are attached guide rails 60 and 60a on which carriage 28 slides perpendicularly to the chutes 9 of the conveyor.

On carriage 28 is mounted a supporting plate 61 which is attached to bars 62 and 62a, all of which slide vertically along carriage 28, the supporting plate being driven by a vertical jack 30.

On the plate 61 is mounted a cradle 29 which is pivotable about an axis 63. Cradle 29 is provided with a roller 64 by means of which it rests on and is guided by the rail 60. Cradle 29 is also inclined for the reception of a part 10 supplied by one of the chutes 9 of the conveyor when the lever 33 is lowered.

Figure 10:
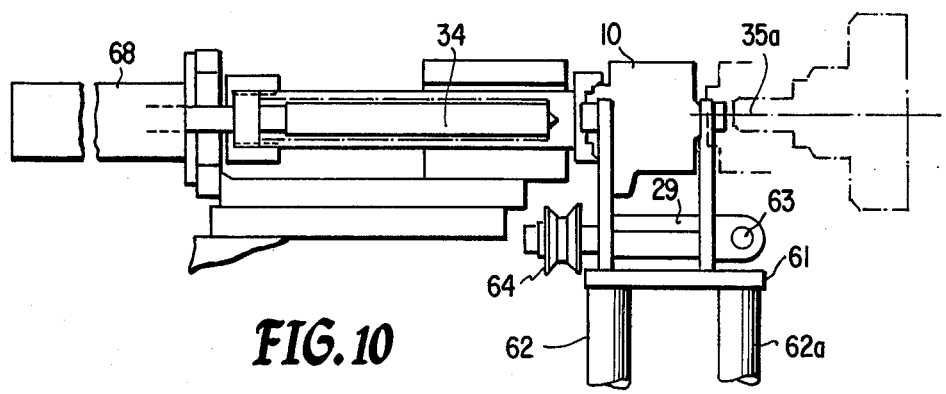
FIG. 10 is a view in elevation of the part-carrying cradle in its "up" position where the part is located between a plunger and the mandrel of the trimming machine preparatory to receiving it.

The carriage 28 is moved by jack 65 perpendicularly to the chutes 9 and is positioned in front of one of the chutes by a retractable stop 31. The stops 31 are actuated sequentially by jacks 66 hinged at 67 so as to locate the empty cradle 29 in front of a chute 9 to receive a part 10 as shown in FIG. 10.

Then the carriage is moved to the end of the rails 60 and 60a, as shown in FIG. 7, beneath one of the expandable mandrels 35a of the turntable. The jack 30 is then actuated so as to raise plate 61 and permit the cradle 28 to rotate about axis 63 so as to rest horizontally on plate 61, as shown in FIG. 10.

At the end of the aforedescribed motion, when the cradle 29 is in its raised position, the part 10 rests in front of mandrel 35a onto which it is pressed by plunger 34 which is driven by a jack 68.

Upon engaging part 10, mandrel 35a is actuated by its control device 69 (see FIG. 8) which provides a lever 70 to work with the rod of a jack 71 in such a way so as to place the mandrel in its release condition. As soon as part 10 is in place on mandrel 35a, the latter is placed back in its holding condition for gripping the part. Upon discharging part 10, the cradle 29 is lowered to receive a new part.

A rotation of 120° by turntable 6 then positions the part held on the mandrel in position 35b on the axis of the spindle of the head 72 of the turning unit 7 (see FIG. 7) which slides on the bed 73 of the machine.

The head 72, the spindle of which is provided with a tool 36, is driven forward to perform the premachining of the external cylindrical surface as well as the front face of part 10.

Figure 12:
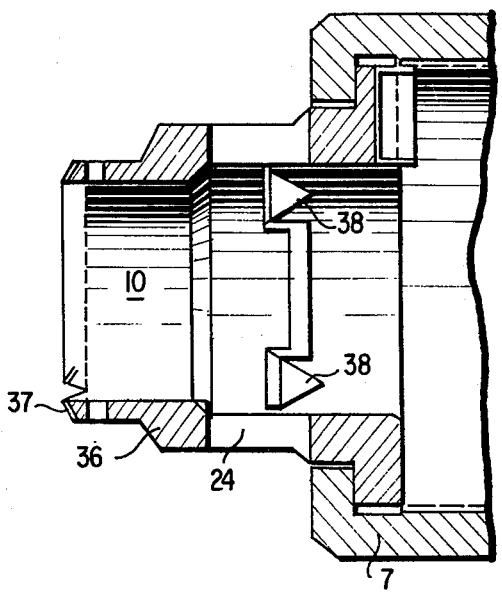
FIG. 12 is a cross-sectional view of the turning tool at the end of its operation.
Figure 13:
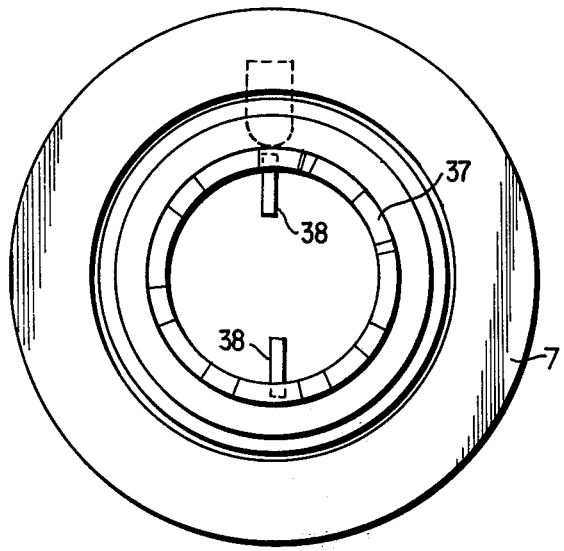
FIG. 13 is a front view of the apparatus as shown in FIG. 12.

Tool 36, which is tubular in shape, as shown in FIGS. 12 and 13, has a ring of teeth 37 on its peripheral end which act to cut off the risers 24 of part 10 and also machine the external cylindrical surface of the part in one pass. The bottom of the tool 36 is provided with fronted dressing tools 38 which grind the front face of the piston head 10.

Figure 8:
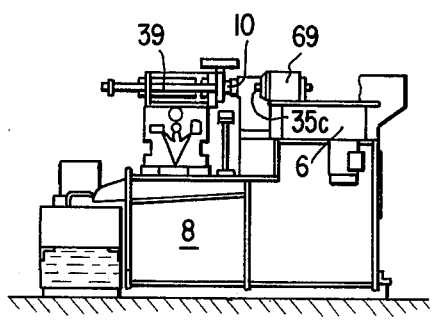
FIG. 8 is a view in elevation and in profile of the broaching unit.

Another 120° rotation of turntable 6 positions the mandrel carrying the part in position 35c on the axis of the head 39 of the broaching unit 8, as shown in FIG. 8.

Figure 14:
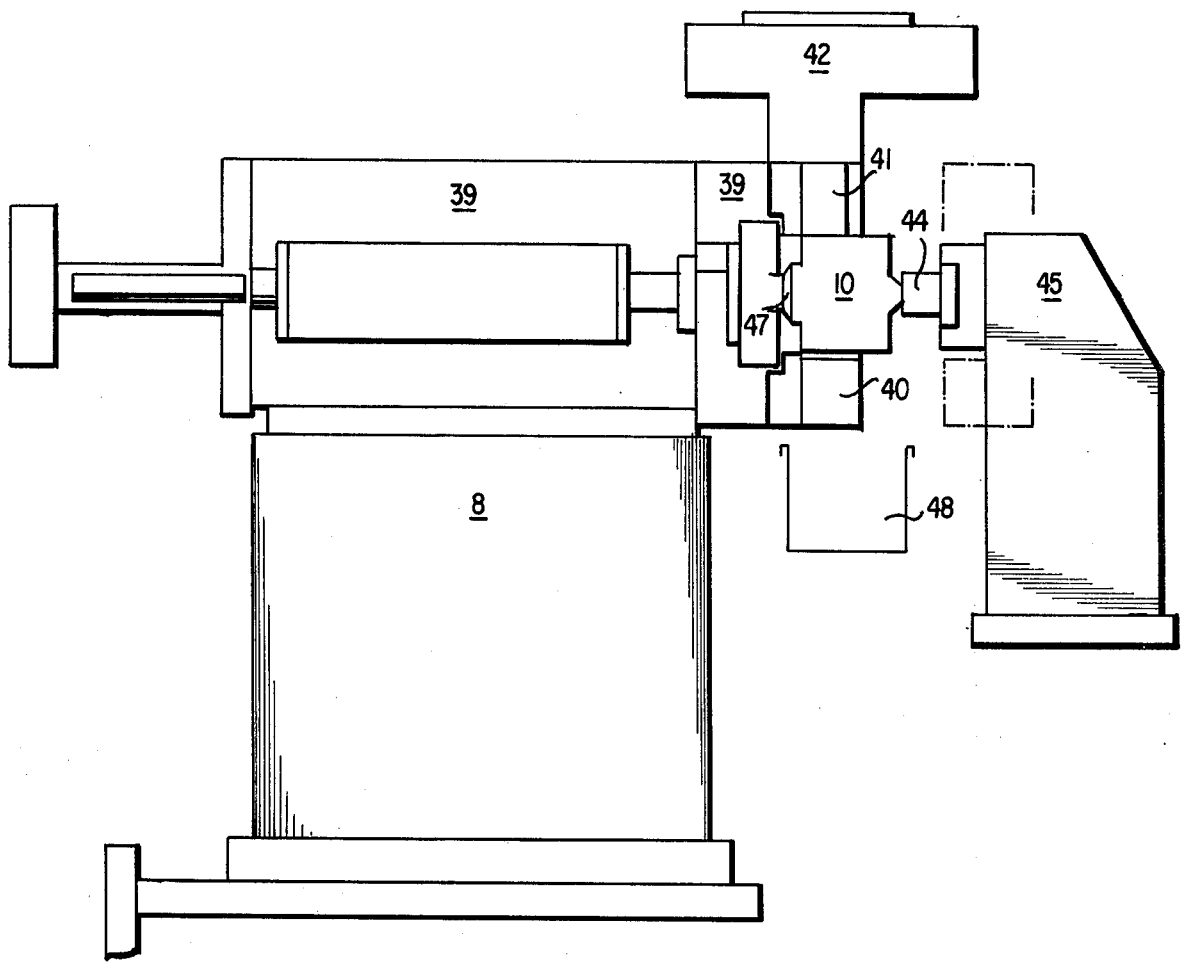
FIG. 14 is an enlarged profile view of the broaching unit of the present invention.

The broaching head 39, shown in enlarged scale in FIG. 14, has a fixed clamp 40 and a movable clamp 41 actuated by a vertical diaphragm jack 42. Clamps 40 and 41 provide a grip on the exterior of part 10 while the jack 43 works with lever 70c of the control mechanism of mandrel 35c to release it and permit the disengagement of the part when the head 39 retracts and thereby places the part in position for broaching, as shown in FIG. 14.

The head 39 is mounted so as to slide laterally on a base 74 and it can be driven, in a known manner, by a worm gear turned by motor 75.

Facing the head 39 is positioned at least one broach 44 fastened to a fixed support 45 so that when the head moves laterally, the free end of the part 10, for example the edge of the skirt of a piston, will be brought into contact with the broach 44 to thereby enable the removing of the fins and flashings from part 10.

Figure 15:
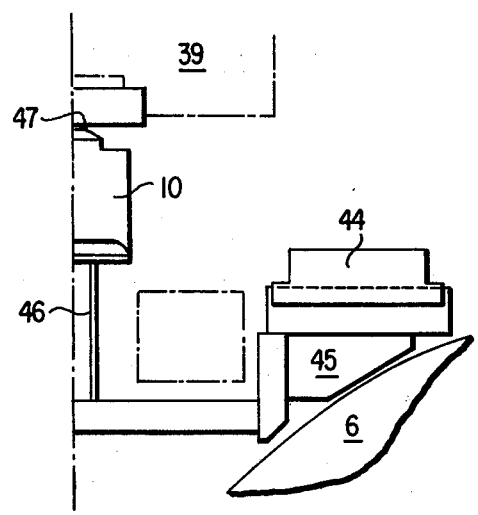
FIG. 15 is a partial top view of the broaching unit according to the present invention.

Referring now to FIG. 15, at the end of the motion of head 39, part 10 will be brought in front of a stop 46 against which it will be held by the force of a fixed ejector 47 when the head 39 retracts. The part 10 then drops into an evacuation trough 48.

During the above-described operation, as in the operation of the cooling conveyor 1, the motion due to the operation is advantageously combined with the handling motion.

The installation according to the present invention thus permits the complete finishing of parts entirely automatically and at a high rate of speed by a simple and compact means. The only storage necessary, i.e. for cooling effected on the conveyor 1, serves in addition as buffer storage between the casting machine and the finishing machine, thereby absorbing stoppages in functioning for changes or maintenance of the equipment of one or the other of them.

Obviously, numerous modifications and variations of the present invention are possible in light of the above teachings. It is therefore to be understood that within the scope of the appended claims the invention may be practiced otherwise than as specifically described herein.

We claim:

1. Apparatus for transferring and finishing parts cast several at a time in a chill-mold which comprises:
    first means for transferring parts from the casting machine a cooling conveyor which is connected to receive said parts from said first means and which is connected to deliver said parts to a second transferring means; said cooling conveyor comprising:
    a frame on which is mounted a series of inclined chutes which comprise parallel bars down which said parts are slidable, a plurality of rows of cooling-fluid sprayers and a hood for drawing off fumes above the chutes a vibrator means on said frame for facilitating the movement of said parts;
    a turntable onto which said parts are mounted in turn from said second transferring means for machining upon passage before turning means and broaching means; and
    two pivoting levers positioned at the lower end of each of said chutes, said levers separated angularly and joined to a common axis and actuated by a jack, said levers further being separated axially by a distance corresponding to one of the dimensions of said part, said levers utilized for the retention of a stack of said parts and for the release of one of said parts to said second transfer means.

2. The apparatus for transferring and finishing of parts according to claim 1, wherein said a second transfer means is positioned at the lower end of said chutes of said cooling conveyor, said second transfer means comprising a carriage slidable perpendicularly to the axes of said guiding chutes, said carriage further including a cradle for receiving a part said cradle being rotatable on axis parallel to the carriage movement, said cradle being inclined longitudinally with said chutes and resting on a guide rail parallel to the direction of carriage motion by means of a roller, said cradle being mounted on a plate which is slidable perpendicularly to the direction of carriage motion.

3. The apparatus for transferring and finishing parts according to claim 2, further comprising on the structure supporting said sliding carriage a plurality of retractable arresting stops operated sequentially and positioned in front of each of said chutes for stopping the movement of said cradle.

4. The apparatus for transferring and finishing parts according to claim 2, wherein said turntable is positioned above said transferring means located at said conveyor output, said turntable having a rotating plate upon which is mounted three expandable mandrels, ready to receive, upon passing before said cradle of said second transferring means, one of said parts.

5. Apparatus for transferring and finishing parts according to claim 4, wherein said turning means comprises a base upon which slides a head provided with a spindle and carrying a tubular tool having a ring of teeth at one end thereof for machining the outside surface of said part, and at the bottom of the inside of said tool are located frontal dressing tools for milling the head of said part.

6. The apparatus for transferring and finishing parts according to claim 4, wherein said broaching means comprises a base upon which slides a head provided with a pair of jaws for gripping said part, said head being movable parallel to a broach attached to a support.

7. The apparatus for transferring and finishing parts according to claim 6, wherein said carriage further comprises a fixed ejector which cooperates with a stop located at the end of the motion of said carriage for evacuation of said part.

* * * * *